Sept. 20, 1949.  V. N. TRAMONTINI  2,482,565
HEATER CONTROL SYSTEM
Filed June 27, 1947
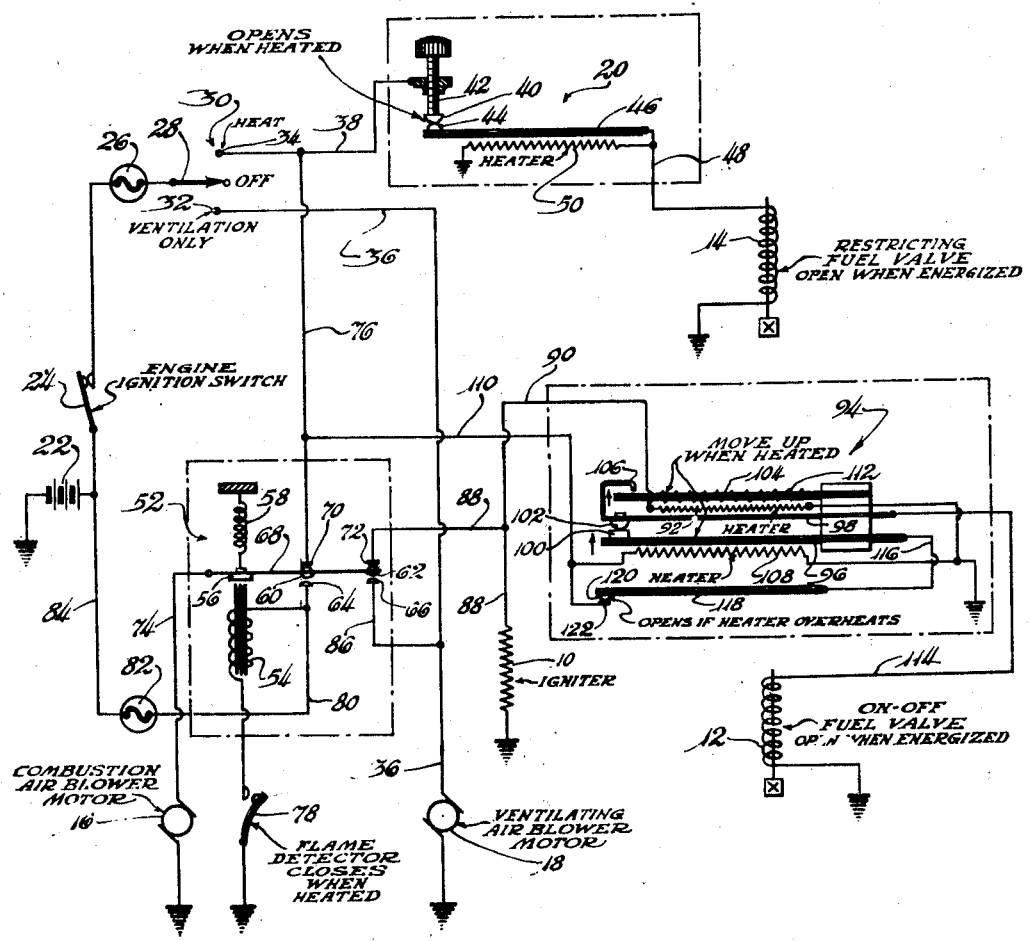
INVENTOR:
Vernon N. Tramontini Patented Sept. 20, 1949

2,482,565

UNITED STATES PATENT OFFICE 2,482,565

HEATER CONTROL SYSTEM

Vernon N. Tramontini, Indianapolis, Ind., assignor to Stewart-Warner Corporation, Chicago, Ill., a corporation of Virginia Application June 27, 1947, Serial No. 757,347

5 Claims. (Cl. 126—110)

The present invention relates to electrical control systems for heaters particularly of the combustion type used for heating the passenger compartment of automotive vehicles. Although the system of the invention has advantages when used with a wide variety of heaters it may be considered as particularly well adapted for the control and operation of a heater of the type shown in the copending application of the same assignee of George W. Allen and Vernon N. Tramontini, Serial No. 676,776, filed June 14, 1946.

One of the objects of the present invention is to provide a control system for a heater of the combustion type which insures safe operation of the heater even in spite of variations such as are occasioned by widely fluctuating voltage and extremes of ambient temperature.

Another object is to provide a control system for a combustion heater which has novel means for turning off the fuel to the heater burner in the event that the heater overheats or fails to start or ceases operating for any reason.

An additional object is to provide an arrangement for accomplishing the above after a time delay interval and for insuring that the interval is approximately constant regardless of fluctuations in the voltage of the electric system of the automotive vehicle.

More specifically, it is an object of the present invention to provide an improved control system for use with a heater installed in an automotive vehicle or under other circumstances in which the voltage may be expected to vary widely, such operating and control system providing the following features: a flow of ventilating air only, if desired; providing for automatically turning off the igniter once combustion has been well established; and providing an arrangement for continuing the flow of ventilating air and combustion air to the heater so as to reduce its temperature and sweep out products of combustion after the flow of fuel to the burner has been discontinued. The system also turns off the flow of fuel to the burner if the heater should overheat or if it fails to start or if it stops for any reason. The system also provides for operation of the heater in such fashion that it automatically cycles between a high heat output position and a low heat output position automatically according to the temperature of the space to be heated. Further the system is so arranged that the heater cannot be started if it is hot or unless the engine ignition is on, but on the other hand, although the heater may be turned off at any time, thereby stopping the flow of fuel to the heater burner, the flow of combustion air and ventilating air to the heater cannot normally be turned off until the heater has cooled down and has been swept free of products of combustion and unburned fuel even though the automobile ignition may be turned off meanwhile.

Yet another object is to provide an improved control system for a combustion heater which automatically gives a plurality of control functions with a minimum of equipment and which is not appreciably affected in its control effects by wide fluctuations in ambient voltage and temperature.

Other objects and advantages will become apparent from the following description of a preferred embodiment of my invention which is illustrated in the accompanying drawing.

In the drawing, the single figure is a diagrammatic representation of a control system and electrical circuit embodying the present invention.

One heater well adapted to be used in conjunction with the control system of the present invention is described in the previously referred to copending application. For the purpose of understanding the present invention it is sufficient to consider that such a heater has a burner and heat exchanger and is provided with an electrical igniter of the hot wire type, indicated by the numeral 10, which is energized at the time of starting the heater. This igniter quickly heats to ignition temperature and normally starts combustion within the heater in a matter of ten to twenty seconds, provided of course the fuel and combustion air have been turned on. Under some conditions ignition may be delayed for a period of an additional half minute or so, particularly if the ambient temperature is extremely low or the voltage is low, since under either of these conditions more time is required to heat the igniter to ignition temperature.

Such a heater has a magnetic on-off valve 12 in the fuel line which interrupts the flow of fuel to the heater unless electrically energized. If energized, the valve opens so as to supply sufficient fuel from a suitable fuel pump normally included in the system to give the maximum heat output from the heater. This on-off valve is arranged in series in the fuel line with a restricting valve 14 which permits a full rate of flow therethrough when electrically energized but which reduces the fuel rate materially when deenergized. When in the de-energized position, the amount of fuel supplied to the heater, provided of course the on-off valve 12 is open, is just sufficient to give safe minimum operation of the burner.

Combustion air is supplied to the heater burner by a blower driven by an electric motor 16 while a second electric motor 18 supplies ventilating air which passes through the heat exchange passages of the heater and thence to the space to be heated. As explained in the referred to copending patent application, the ventilating air preferably is supplied from an uncontaminated outside source rather than being recirculated, since better ventilation and better humidity regulation is obtained by this arrangement.

As will be explained in greater detail presently, the restricting valve 14 is operated by an impulse sending thermostat 20 located within the space to be heated. This thermostat is so arranged that it sends electrical impulses of comparatively short duration and of short frequency to the restriction valve in such manner that as more heat is required within the driver's compartment the total flow of electrical energy through the impulse sender 20 and restriction valve 14 over a period of time will be greater and thus the restriction valve will be open a larger portion of the time.

Additional equipment shown in the figure for practicing the present invention includes the automobile battery 22, one side of which is grounded while the other side is connected through the automobile engine ignition switch 24 to a fuse or the equivalent 26 and thence to the swinging member 28 of a single pole, double throw switch 30. The switch has three positions which include a central off position, a ventilating position, and a heating position, the latter two positions being indicated, respectively, on the drawing by contacts 32 and 34.

Contact 32 which provides for ventilation only is directly connected by a lead 36 to one of the terminals of the ventilating air blower motor 18, the other terminal of this motor being grounded. Thus, whenever the ignition switch 24 is closed and the heating system switch 30 is in the ventilation position the ventilating air motor 18 will be energized so as to circulate air at atmospheric temperature from outside the vehicle to the driver's compartment. Under these conditions, ventilation without heat is provided.

The heater terminal 34 of the heater system switch 30 is connected by line 38 to the fixed contact 40 of the impulse sending switch 20. This contact is mounted upon the end of an adjustment screw 42 so that although its position remains fixed during use it may be adjusted inwardly or outwardly as conditions require. This contact 40 co-operates with a second contact 44 mounted at the end of a bimetal blade 46, the opposite end of which is fixed and connected by a wire 48 to the restriction valve 14, the opposite end of the winding of this valve being grounded. The wire 48 is also connected by way of a resistance heating element 50 to ground.

If it is assumed that the ignition switch 24 is closed, that the switch 30 is in the heating position and that contacts 40 and 44 are in engagement, then an electric current will flow through the winding of the restriction valve 14, thereby opening this valve to its full flow position. Simultaneously current will pass through the resistance element 50 so as to raise its temperature. This resistance element is arranged in heat exchange relation to the bimetal blade 46 so as to raise the temperature of this blade whenever electrical energy flows through this portion of the circuit. The bimetal blade is so oriented that an increase in its temperature causes the free end thereof to deflect so as to move the contact 44 away from the fixed contact 40, thereby interrupting the circuit to the restricting valve 14 and the heating element 50. When this happens, the flow of fuel to the heater drops to the minimum position and simultaneously de-energizing the heating element 50 causes it and the bimetal blade 46 to cool. The electrical impulses sent by the switch 20 to the restriction valve 14 therefore cause the valve 12 to cycle on and off at a rate which is substantially uniform so long as the atmospheric temperature surrounding the bimetal blade 46 remains constant.

If the atmospheric temperature at the blade 46 decreases, heat will be exchanged from the blade to the atmosphere more rapidly. This causes more rapid cooling of the blade during the off portion of the cycle while at the same time the increased rate of heat loss to the atmosphere will cause slower heating during the on portion of the cycle. It is apparent, therefore, that the lower the atmospheric temperature the greater will be the electrical energy sent through this portion of the circuit to the restriction valve 14 and to the heating element 50.

The control circuit also includes a double pole, double throw relay 52 which may be of conventional construction. It has an electric winding 54 which when energized attracts an armature 56 against the action of a spring 58 so as to swing a pair of contacts 60 and 62 into engagement with fixed contacts 64 and 66, respectively. Whenever the coil 54 is de-energized the swinging member 68 of the relay will be retracted by the spring 58 so as to move the contacts 60 and 62 into engagement with fixed contacts 70 and 72, respectively.

The swinging contacts 60 and 62 are connected together electrically and to a lead 74 connected in turn to one terminal of the combustion air blower motor 16, the opposite side of this motor being grounded. Other connections to the relay include a branch 76 from the lead 38 to the contact 70 and a connection from the contact 64 through the relay coil 54 and thence to ground by way of a thermostatic switch 78. This thermostatic switch is sensitive to the temperature of the heater burner and is normally in open circuit position but closes whenever the temperature of the burner rises a predetermined amount. In other words, this switch may be considered as a flame detector which closes the circuit through the relay coil 54 after the temperature of the switch has increased sufficiently to indicate the present of stable combustion within the heater burner. The contact 64 is also connected by a lead 80 to a fuse or its equivalent 82 and thence by a wire 84 to the hot side of the battery 22. Thus the contact 64 is always energized and the coil 54 will always be energized whenever the flame detector switch 78 is closed.

Additional electrical connections include a wire 86 leading from the contact 66 to the line 36 so that the ventilating motor 18 is connected to the contact 66 as well as to switch contact 32. Contact 72 is connected by a line 88 which leads to one terminal of the igniter 10, the opposite side of the igniter being grounded. This lead 88 also is connected by a branch 90 to one end of a resistance heating element 92, the opposite end of which is grounded. Heater 92 comprises a portion of a control switch indicated generally by the numeral 94 which serves to give certain safety functions of the control system a time delay characteristic and which does this regardless of voltage fluctuations. This particular switch forms the subject matter of my copending application Serial No. 697,127, filed September 14, 1946.

In general, the control switch 94 comprises a bimetallic strip 96, the free end of which flexes upwardly when heated, arranged in parallel relation to a spring metal blade 98. Blades 96 and 98 are provided at their ends with mating contacts 100 and 102, respectively, these contacts normally being in engagement. A second bimetal strip 104 is arranged above the spring metal blade 98 and is so disposed that when its temperature increases its free end moves upwardly so as to engage beneath the end of a hook 106 which is formed as a continuation of the free end of the spring blade 98. Thus, increasing the temperature of the blade 96 tends to hold contacts 102 and 100 together while increasing the temperature of the bimetal blade 104 tends to cause this blade to lift the hook 106 and separate contacts 100 and 102.

A heater element of resistance type 108 is connected on one side by way of a line 110 with the lead 76, the other side being grounded so that the temperature of the element 108 is raised whenever the line 76 is energized. This heater element 108 is disposed in heat exchange relation to the bimetal strip 96 so as to heat the same and cause it to deflect upwardly whenever the element 108 is energized. Similarly, the bimetal strip 104 is caused to deflect upwardly whenever its temperature is increased by the heating element 92 previously mentioned. The bimetal element 104 is wrapped with a layer of soft wire 112 which does not appreciably alter its flexibility or resistance to deflection but which adds considerable heat capacity.

The switch operates in the following manner. If the heaters 108 and 92 are energized simultaneously, the heater 108 which draws slightly less power and therefore delivers slightly less heat will nevertheless increase the temperature of the bimetal blade 96 more rapidly than the heater 92 will increase the temperature of the blade 104 because of the additional heat capacity of the upper blade due to the coil 112. Because the temperature of the blade 96 increases more rapidly than the temperature of the blade 104 the free end of the blade 96 moving upwardly will lift the spring strip 98 at a sufficiently rapid rate to prevent the free end of the upper bimetallic strip from catching beneath the hook 106 for a considerable period. Eventually, however, the additional heat output of the upper heating element 92 will raise the temperature of the bimetal strip 106 above that of the bimetal strip 96, thereby causing the free end of the strip 104 to catch beneath the hook 106 and separate the contacts 100 and 102. The advantage of this device is that it gives a time delay which is substantially constant regardless of the voltage. In other words, a low voltage will cause both strips to heat up more slowly than will be the case if a higher voltage is impressed upon the heating elements. On the other hand, however, even though the strips may heat at a different rate depending upon the ambient voltage, the relative movement between the free ends is substantially constant. This feature of the present circuit is explained in greater detail in the previously referred to copending application.

The on-off fuel valve 12, one side of which is grounded, is energized on its other side by a line 114 connected to the spring metal blade 98. This blade in turn is energized by way of contact 102 which is associated with contact 100 secured to the blade 96, this blade in turn being connected by a lead 116 to a bimetal blade 118 which carries a contact 120 at its free end associated with a contact 122 connected by a lead 110 to the line 76. Therefore, so long as contacts 120 and 122 are together and contacts 100 and 102 are also together fuel valve 12 will be open, provided of course that the switch 30 is in the "heat" position and the engine ignition switch is closed.

The device operates in the following manner. Whenever the engine ignition switch 24 is closed the swinging member of the switch 30 will be energized. If this swinging member is in the "ventilation only" position, that is, in contact with the terminal 32, the line 36 will be energized and this in turn energizes the ventilating blower motor 18. Ventilating air will therefore be circulated to the passenger compartment. The circuit is otherwise inoperative since the contact 66 although connected by the lead 86 to the line 36 is not in contact with the contact 62. Similarly, the lead 84 which is always energized leads to the contact 64 which is open and by way of relay coil 54 to the flame detector switch 78 which is also open because of the low temperature of the heater burner.

If the switch 34 is shifted to the "off" position the ventilating air blower is de-energized and the circuit is therefore inoperative.

If the switch 34 is shifted to the "heat" position, line 76 is energized and therefore supplies current by way of contacts 70 and 60 to the relay blade 68 and thence by way of lead 74 to the combustion air blower motor 16. Combustion air is therefore supplied to the heater. Also current is supplied by way of contacts 70 and 60 and thence through contacts 62 and 72 to the igniter 10. The temperature of the igniter therefore begins to increase. Simultaneously, leads 88 and 90 energize the heater element 92 while heater element 108 is similarly energized by way of lead 110 connected in turn to the line 76. Both heater elements 92 and 108 therefore start to increase the temperature of their respective blades 104 and 94 simultaneously.

The contacts 100 and 102 remain together, however, since they will not be separated unless both heaters 108 and 92 are energized for a period of the order of two minutes. Electric current is also supplied by way of the lead 110 to contact 122 and thence by way of contact 120 and overheat switch blade 118 to the bimetal strip 96 and thence by way of contacts 110 and 102 to the spring metal strip 98 which is connected by lead 114 to the on-off valve 12. This valve therefore opens and supplies fuel to the heater by way of the restricting valve 14.

Lead 38 connected to switch contact 34 is also connected to contact 40 of the impulse sender and current flows from the latter contact by way of contact 40 to the bimetal blade 46 and thence to ground through the switch heater 50 and by way of lead 48 and restricting valve 14. The restricting valve therefore opens and permits fuel to flow to the heater at the maximum rate.

Within a matter of ten seconds or so the igniter will be raised to ignition temperature and combustion will be established within the heater. Shortly thereafter, flame detector switch 78 is heated sufficiently by the burner so that it closes. This establishes a circuit through the relay coil 54, thereby attracting the armature 56 and shifting the contact 60 from the contact 70 to the contact 64 and simultaneously shifting the contact 62 from the contact 72 to the contact 66. An electric circuit is therefore established directly from the battery 22 by way of lead 84 and contact 64 to the contact 60 and relay blade 68. From this blade it flows by way of contact 66 to the ventilating air blower motor. This late starting of the ventilating blower prevents cold air from being circulated while the burner is heating the heat exchanger to the operating level. The combustion air blower motor 16 is also energized since it is connected directly to the relay blade 68. Inasmuch as contacts 62 and 72 are separated, however, the igniter 10 will be de-energized as will the switch heater 92. Heater 108, however, remains energized by way of the lines 110 and 76. It is apparent, therefore, that after combustion has been well established the igniter 10 is de-energized, the ventilating blower is started, and that the bimetal strip 104 is permitted to cool without ever having lifted the hook 106. The fuel valve 16 therefore remains open.

The heater now may be considered as being in normal operation and the heat output is controlled by the impulse sending unit 20 which operates in the following manner. As the temperature of the bimetal blade 46 is increased by operation of the heater 50 it will eventually deflect downwardly so as to separate contacts 40 and 44. This de-energizes the heating element 50 and permits the switch blade 46 to cool and simultaneously de-energizes the restricting fuel valve 14, thereby shifting the heater to low operation. Shortly thereafter, the strip 46 will have cooled sufficiently to bring contacts 40 and 44 together, thereby re-energizing the heating element 50 and the restricting valve 14 so as to shift the heater to high operating position. Since the length of the on cycles as compared to the off cycles of the switch 20 depends upon the rate of heating and the rate of cooling of the switch blade 46, it is apparent that over a period of time the total time of the current is flowing through the lead 48 to the restricting valve 14 will be greater if the ambient temperature at the switch 20 is low. In other words, the rate of heat loss from the blade 46 to the atmosphere will be greater when the temperature differential between the switch blade and the atmosphere is greater and this differential, of course, is greater when the ambient temperature is low. The impulse sending unit 20, therefore, cycles the heater between high and low in an appropriate manner to maintain a predetermined temperature within the space to be heated and this temperature is set by adjusting the position of the contact 40 by rotating the screw 42.

If, while the heater is in operation, it overheats for any reason, the bimetal element 118 sensitive to heater temperature deflects and separates the contact 20 from the contact 22. This opens the circuit to the on-off fuel valve 12 and extinguishes combustion. The combustion air blower 16 and the ventilating air motor 18, however, continue to operate until the temperature within the heater has dropped sufficiently to reopen the flame detector 78 so as to de-energize relay coil 54 and permit the relay to drop into its starting position. The heater thereafter is restarted in the customary manner.

If the heater fails to start, the flame detector switch 78 remains open, thereby permitting the relay 52 to remain in its starting position. Heater 92, therefore, continues to raise the temperature of the bimetal strip 104 until it is deflected upwardly sufficiently to catch the hook 106 and separate contacts 102 and 100. When this occurs, the circuit to the on-off valve 12 is opened and this valve shifts to the closed position, thereby turning off the fuel to the heater. The combustion air blower motor 16, however, continues to operate so as to clean out the combustion chamber and vaporize and remove therefrom all of the unconsumed fuel.

If the heater has been placed in operation and subsequently combustion becomes extinguished for any reason, the flame detector 78 soon opens since the combustion chamber is quickly cooled by the flow of combustion air and ventilating air. As soon as the flame detector switch opens, relay 54 will be re-energized so that it is shifted to the starting position and this, as pointed out in the last paragraph above, soon causes the main fuel valve 12 to be closed.

After the heater has been placed in operation, whenever it is subsequently turned off either by shifting the switch 38 to the off position or by opening the engine ignition switch 24 so as to stop the engine motor, the line 76 will be de-energized, thereby closing the on-off valve 12. The ventilating air blower motor 18 and the combustion air blower motor 16, however, continue to operate since they are energized directly from the battery through lead 84 and contacts 64 and 66. These blower motors continue in operation until the temperature of the combustion chamber has been lowered sufficiently to open the flame detector switch 78, thereby insuring that the heater is left in a cooled and safe condition with all of the products of combustion and unconsumed fuel removed from the combustion chamber.

If the heater is turned off and is immediately turned on again before the flame detector switch 78 has had an opportunity to reopen, the heater will not attempt to restart since it is necessary for the relay 52 to be in its starting position before the igniter 10 can be energized. This prevents the possibility of rough starting being brought about by excess of fuel flowing into the hot heater and being quickly vaporized during the period while the igniter is being brought up to ignition temperature. The operation of the circuit, therefore, is such that it is necessary for the combustion temperature to drop sufficiently to actuate the flame detector after which the igniter 10 is energized and is brought up to ignition temperature at which time combustion is started in a relatively cool combustion chamber under which conditions minor explosions which are frequently the cause of difficult starting are avoided. The circuit, therefore, insures that the heater will start smoothly without it being necessary for the operator to perform any function other than to turn the heater on or off.

From the above description of a preferred embodiment of my invention it will be seen that this invention carries out all of the objectives set forth for it with a minimum of control equipment, all of which is comparatively inexpensive.

Having described my invention, what I claim as new and useful and desire to secure by Letters Patent of the United States is:

1. A heater system comprising an electric igniter of the resistance type, a ventilating air blower motor, a combustion air blower motor, an electrically operated on-off fuel valve, a burner, a cold closed thermostatic overheat switch sensitive to burner temperature and a normally open flame detector switch sensitive to the temperature of said burner, said switch being adapted to close when the temperature of said burner rises to a predetermined level; a relay having electrically energized means for shifting said relay from one position to a second position, said circuit including a source of electric potential and connections from said source through said relay electrically energized means and flame detector switch in series, a second circuit from said source to said ventilating air blower motor through said relay when said relay is in the second said position, a third circuit from said source to said combustion air blower motor through said relay when said relay is in said second position, another circuit from said source by way of said relay when said relay is in the first said position to said igniter, and a further circuit from said source through said cold closed thermostatic switch and including said on-off valve.

2. A heater system comprising an electric igniter of the resistance type, a ventilating air blower motor, a combustion air blower motor, an electrically operated on-off fuel valve, a burner, a cold closed thermostatic overheat switch sensitive to burner temperature and a normally open flame detector switch sensitive to the temperature of said burner, said switch being adapted to close when the temperature of said burner rises to a predetermined level; a relay having electrically energized means for shifting said relay from one position to a second position, said circuit including a source of electric potential and connections from said source through said relay electrically energized means and flame detector switch in series, a second circuit from said source to said ventilating air blower motor through said relay when said relay is in the second said position, a third circuit from said source to said combustion air blower motor through said relay when said relay is in said second position, another circuit from said source by way of said relay when said relay is in the first said position to said igniter, a further circuit from said source through said cold closed thermostatic switch and including said on-off valve, a time delay switch having normally closed contacts, an electrically energized operating mechanism for operating said contacts after said mechanism has been energized for a predetermined length of time, circuit means in parallel with said igniter for energizing the last said mechanism, and said further circuit including the last said contacts.

3. A heater system comprising a burner, a flame detector switch operated by a rise in burner temperature, an electric igniter, a combustion air blower motor, a ventilating air blower motor, an electrically operated on-off fuel valve, a heater switch, means for originally and simultaneously connecting said igniter, said valve, and said combustion air blower motor to a source of electric power by way of said heater switch when said heater switch is closed, means including said flame detector switch for disconnecting said igniter from said source when said flame detector switch is operated and for simultaneously connecting said combustion air blower motor and said ventilating air blower motor directly to said source independently of said heater switch.

4. A heater system comprising a burner, a flame detector switch operated by a rise in burner temperature, an electric igniter, a combustion air blower motor, a ventilating air blower motor, an electrically operated on-off fuel valve, a heater switch, means for originally and simultaneously connecting said igniter, said valve, and said combustion air blower motor to a source of electric power by way of said heater switch when said heater switch is closed, means including said flame detector switch for disconnecting said igniter from said source when said flame detector switch is operated and for simultaneously connecting said combustion air blower motor and said ventilating air blower motor directly to said source independently of said heater switch, electrically energized means for closing said valve a predetermined time interval after being energized and the last said means being connected to be energized and de-energized along with said igniter.

5. A heater system comprising a burner, a flame detector switch operated by a rise in burner temperature, an electric igniter, a combustion air blower motor, a ventilating air blower motor, an electrically operated on-off fuel valve, a heater switch, means for originally and simultaneously connecting said igniter, said valve, and said combustion air blower motor to a source of electric power by way of said heater switch when said heater switch is closed, means including said flame detector switch for disconnecting said igniter from said source when said flame detector switch is operated and for simultaneously connecting said combustion air blower motor and said ventilating air blower motor directly to said source independently of said heater switch, electrically energized means for closing said valve a predetermined time interval after being energized, the last said means being connected to be energized and de-energized along with said igniter, and other electrically energized means for prolonging the time of operation of the last said electrically energized means, said other electrically energized means being corrected to be energized whenever said heater switch is closed.

VERNON N. TRAMONTINI.

REFERENCES CITED

The following references are of record in the file of this patent:

UNITED STATES PATENTS

| Number | Name | Date |
| --- | --- | --- |
| 2,143,569 | Nessell | Jan. 10, 1939 |
| 2,308,887 | McCollum | Jan. 19, 1943 |
| 2,333,602 | Van Almelo | Nov. 2, 1943 |

Certificate of Correction

Patent No. 2,482,565 September 20, 1949

VERNON N. TRAMONTINI

It is hereby certified that errors appear in the printed specification of the above numbered patent requiring correction as follows:

Column 3, line 34, for the word "The" before "switch" read *This*; column 4, line 57, for "present" read *presence*; column 7, line 44, after "time" strike out "of"; line 47, for "order" read *other*; column 10, line 51, for "corrected" read *connected*;

and that the said Letters Patent should be read with these corrections therein that the same may conform to the record of the case in the Patent Office.

Signed and sealed this 14th day of February, A. D. 1950.

[SEAL]

THOMAS F. MURPHY,
*Assistant Commissioner of Patents.*